(12) United States Patent
Rooney et al.

(10) Patent No.: US 8,782,173 B2
(45) Date of Patent: Jul. 15, 2014

(54) AUDITABLE DISTRIBUTION OF A DATA FILE

(75) Inventors: John G. Rooney, Rueschlikon (CH); Christopher J. Giblin, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 13/070,429

(22) Filed: Mar. 23, 2011

(65) Prior Publication Data
US 2011/0238790 A1 Sep. 29, 2011

(30) Foreign Application Priority Data

Mar. 23, 2010 (EP) ..................................... 10157428

(51) Int. Cl.
*G06F 15/16* (2006.01)
(52) U.S. Cl.
USPC ........................................................ 709/219
(58) Field of Classification Search
None
See application file for complete search history.

(56) References Cited

U.S. PATENT DOCUMENTS

| 7,047,406 | B2 | 5/2006 | Schleicher et al. |
| 7,073,191 | B2 | 7/2006 | Srikantan et al. |
| 2002/0138744 | A1 | 9/2002 | Schleicher et al. |
| 2003/0163702 | A1 | 8/2003 | Vigue et al. |
| 2004/0034870 | A1 | 2/2004 | O'Brien et al. |
| 2006/0212595 | A1 | 9/2006 | Chen et al. |
| 2007/0266446 | A1 | 11/2007 | Aaron |
| 2008/0133666 | A1 | 6/2008 | Chavez et al. |
| 2008/0208963 | A1 | 8/2008 | Eyal et al. |
| 2008/0222212 | A1 | 9/2008 | Prasad et al. |
| 2008/0244077 | A1 | 10/2008 | Canosa |
| 2008/0250239 | A1* | 10/2008 | Risan et al. .................... 713/153 |
| 2009/0055471 | A1 | 2/2009 | Kozat et al. |
| 2009/0063691 | A1* | 3/2009 | Kalofonos et al. ............ 709/229 |
| 2009/0150972 | A1* | 6/2009 | Moon et al. ........................ 726/1 |
| 2009/0248872 | A1* | 10/2009 | Luzzatti et al. ............... 709/226 |

FOREIGN PATENT DOCUMENTS

WO 2007053727 A2 5/2007

OTHER PUBLICATIONS

A. Sherman et al., "Adding trust to P2P distribution of paid content," Proceedings of ISC 2009, year 2009.
"TIBCO Managed File Transfer brochure," copyright 2008.
D. Levin et al., "Trlnc: small trusted Hardware for large distributed systems," Proceedings of NSDI 2009, year 2009.
Digital Rapids C2 brochure, copyright 2011.

* cited by examiner

*Primary Examiner* — Robert C Scheibel
*Assistant Examiner* — Omeed D Rahgozar
(74) *Attorney, Agent, or Firm* — Feb Cabrasawan

(57) ABSTRACT

Auditable data distribution from a server to clients is achieved as follows. The server delivers chunks of a data file, and identifiers of the chunks, to the clients. For each chunk of the data file received by the clients, a digest is generated by the client that received the chunk, using at least a part of the chunk and further data of the client that received the chunk. The further data is known to the server. The client that received this chunk sends the digest to the server, which receives the digest. The server determines an identity of the clink that received the chunk in question, by comparing the digest to the chunks that the server has sent and to the further data known to the server. The server stores the identity of the client that received the chunk.

14 Claims, 5 Drawing Sheets

AUDITABLE DISTRIBUTION OF A DATA FILE

RELATED APPLICATIONS

The present patent application claims priority under 35 USC 119 to the previously filed and presently pending patent application entitled of the same title, filed with the European Patent Office on Mar. 23, 2010, and assigned application number 10157428.3.

BACKGROUND

In many computing scenarios, data is distributed from a server to a number of clients. For instance, a server may be a central repository of data. Different clients may at different times request portions of this data to perform processing on the data. As another scenario, the clients may provide backup services to the server for the data. Each client may in this scenario store a portion of the data, or all the data.

SUMMARY

A method of an embodiment of the invention is for auditable data distribution. The method includes delivering, by a server, chunks of a data file and identifiers of the chunks to clients. The method includes the following for each chunk of the data file received by the clients. A digest is generated by the client that received the chunk, using at least a part of the chunk and further data of the client that received the chunk. The further data is known to the server. The client that received the chunk sends the digest to the server. The server receives the digest and determines an identity of the client that received the chunk, by comparing the digest to the chunks that the server has sent and to the further data known to the server. The server stores the identity of the client that received the chunk.

Generating the digest by the client that received each chunk, sending the digest from the client to the server, determining the identity of the client that received the chunk by the server, and storing the identity of the client that received the chunk by the server provide for auditable data distribution of the data file among the clients from the server. The data file is auditably distributed because the server knows the identity of the client that has received each chunk of the data file. Auditable data distribution can thus be defined in this manner.

A server of an embodiment of the invention is connectable to clients. The server includes a processor, and a computer-readable data storage medium to store a data file and a computer program executable by the processor. The data file includes chunks. The computer program includes a first computer program part to deliver the chunks of the data file and identifiers of the chunks to the clients. The computer program includes a second computer program part to receive a digest for each chunk received by each client. The chunk is generated by the client that received the chunk using at least a part of the chunk and further data of the client. The further data is known to the server. The computer program includes a third computer program part to determine for each chunk an identity of the client that received the chunk by comparing each digest received to the chunks of the data file and to the further data of each client. The computer program includes a fourth computer program part to store the identity of the client that possesses each chunk.

Receiving the digest for each chunk, determining the identity of the client that received the chunk, and storing the identity of the client that received the chunk provide for auditable data distribution of the data file among the clients from the server. The data file is auditably distributed because the server knows the identity of the client that has received each chunk of the data file. Auditable data distribution can thus be defined in this manner.

A client of an embodiment of the invention is connectable to a server and to an additional client. The client includes a processor, and a computer-readable data storage medium to store at least a computer program executable by the processor. The computer program includes a first computer program part to receive a chunk of a data file from the server. The computer program includes a second computer program part to generate a digest using at least a part of the chunk and further data of the client. The further data is known to the server. The computer program includes a third computer program part to send the digest to the server.

Generating the digest by the client, and sending the digest from the client to the server provide for auditable data distribution of the data file. The data file is auditably distributed because the server knows the identity of the client that received each chunk of a plurality of chunks the data file. Auditable data distribution can thus be defined in this manner.

A computer-readable data storage medium of an embodiment of the invention stores a computer program executable by a processor of a server. Execution of the computer program by the processor causes a method to be performed. The method includes delivering chunks of a data file and identifiers of the chunks to clients. The method includes the following for each chunk of the data file. A digest is received from the client that received the chunk of the data file. The digest is generated by the client that received the chunk of the data file using at least a part of the chunk and further data of the client that received the chunk. The further data is known to the server. An identity of the client that received the chunk is determined, by comparing the digest to the chunks that the server has sent and to the further data known to the server. The identity of the client that received the chunk is stored.

Receiving the digest for each chunk, determining the identity of the client that received the chunk, and storing the identity of the client that received the chunk provide for auditable data distribution of the data file among the clients from the server. The data file is auditably distributed because the server knows the identity of the client that has received each chunk of the data file. Auditable data distribution can thus be defined in this manner.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, data is often distributed from a server to a number of clients. However, the server may not know at any given time which client possesses which data. That is, the data distribution may not be auditable, in that it cannot be determined by the server which client has which data. Furthermore, to decrease the load on the server, the data that is stored on the server may be able to be distributed among the clients themselves. However, this presents a potential security risk, in that a nefarious client may receive data from a client that the nefarious client otherwise was unable to receive from the server itself Techniques disclosed herein provide for solutions to these and other problems. A server delivers chunks of a data file, and identifiers of the chunks, to clients. For each chunk of the data file that is received by the clients, the client that received the chunk generates a digest using at least a part of the chunk and further data of the client in question. This further data is known to the server. The client then sends the digest to the server, which determines the identity of the client by comparing the digest to the chunks that the server has sent and to the further data of each client. The identity of the client that received the chunk in question is stored by the server. As such, the data distribution is auditable, because the server tracks which clients have received which chunks of the data file.

Furthermore, if a first client requests that a second client send it a particular chunk of the data file, the second client only sends the first client this particular chunk if the second client can verify that the first client already has in its possession a different chunk of the data file. The second client can perform this verification via the server. As such, the potential security risk outlined above is avoided.

As such, the techniques disclosed herein can provide that the distribution of the chunks of the file is auditable, so the server always knows which client received which chunk of the file. Therefore, the distribution of chunks of a data file is used while the distribution remains auditable. In one embodiment, the client may encrypt the digest before sending the encrypted digest to the server and the server decrypts the encrypted digest before checking the digest. This can improve the secure data exchange between the client and the server. In one embodiment, the server distributes in parallel chunks of the file and the identifiers to different groups of the clients and the different groups exchange the chunks and the identifiers of the chunks.

In one embodiment, a client informs other clients which chunk the client possesses, and thereafter a client can request another client to deliver a specific chunk of the file. In one embodiment, the server may hold back at least one chunk of the file, such that a client is forced to request the server to deliver the hold back chunk. In one embodiment, a client checks with the server whether another client possesses a specific chunk, and the client requests the other client to send the chunk if the server proves that the other client possesses the determined chunk. In one embodiment, the server holds back a specific chunk of the file until a client can show that it possesses all other chunks of the file, and only thereafter does the server deliver the specific chunk to the client.

In one embodiment, a data path is used between the server and the clients and among the clients for delivering the chunks of the file. In this embodiment, a control path is used between the server and the clients and among the clients for delivering information about the chunks and/or the clients. In this embodiment, then, different paths are used for the file and the information, which can improve how quickly the data file is distributed among the clients.

Figure 1:
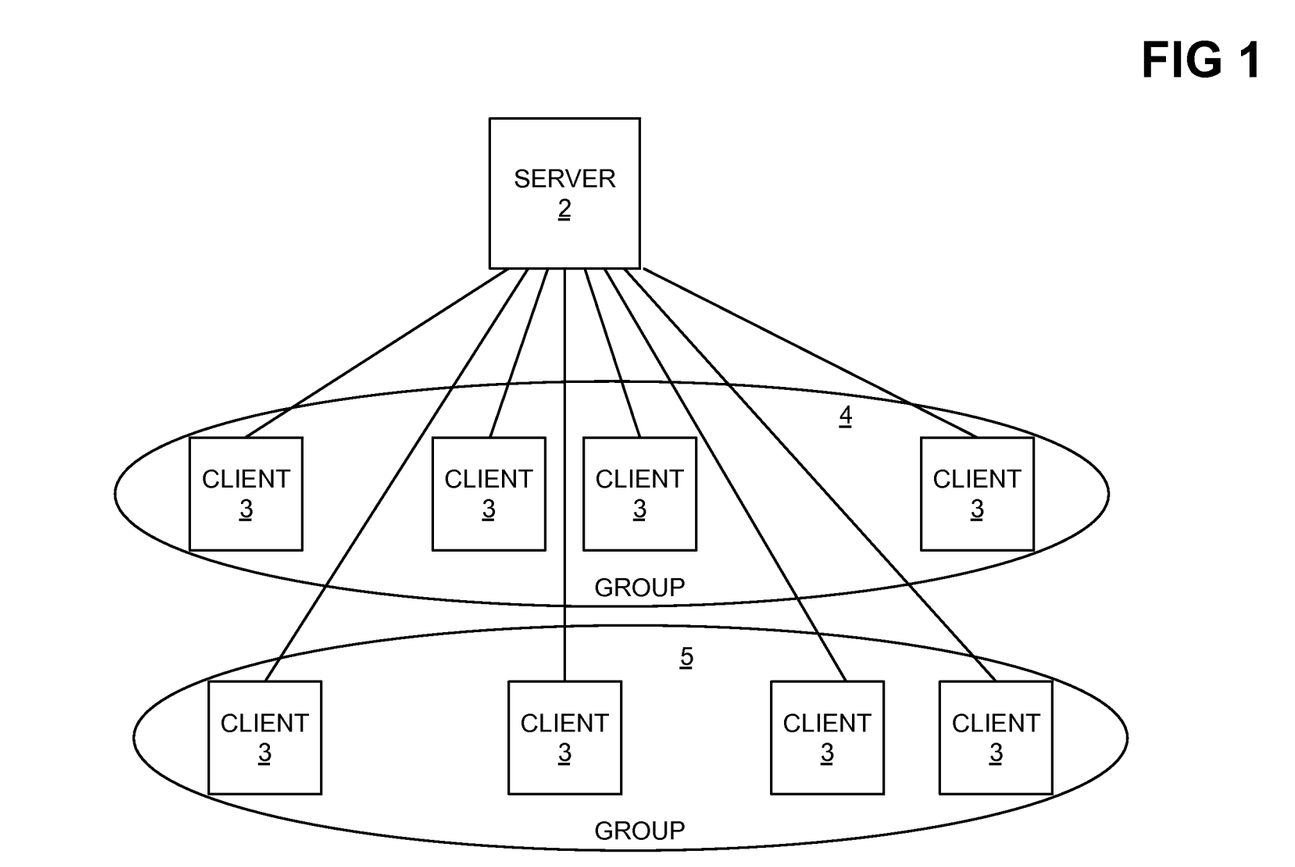
FIG. 1 is a diagram of a network system, according to an embodiment of the invention.

FIG. 1 illustrates an embodiment of a network system 1 for implementing web services, for instance. The network system 1 may include a server 2 and several clients 3 which are connectable to each other. In the shown embodiment, the server 2 is connectable to a first group 4 of clients 3 and to a second group 5 of clients 3. The server 2 may be connectable to all clients.

The connections between the server and the clients and between the clients and the clients are illustrated by lines. The server 2 and the clients 3 may be embodied as computers, whereby the server 2 provides a data file that is to be delivered to the clients 3. The data file may comprise any kind of data. The file may include a text, a picture, music or a video stream.

Figure 2:
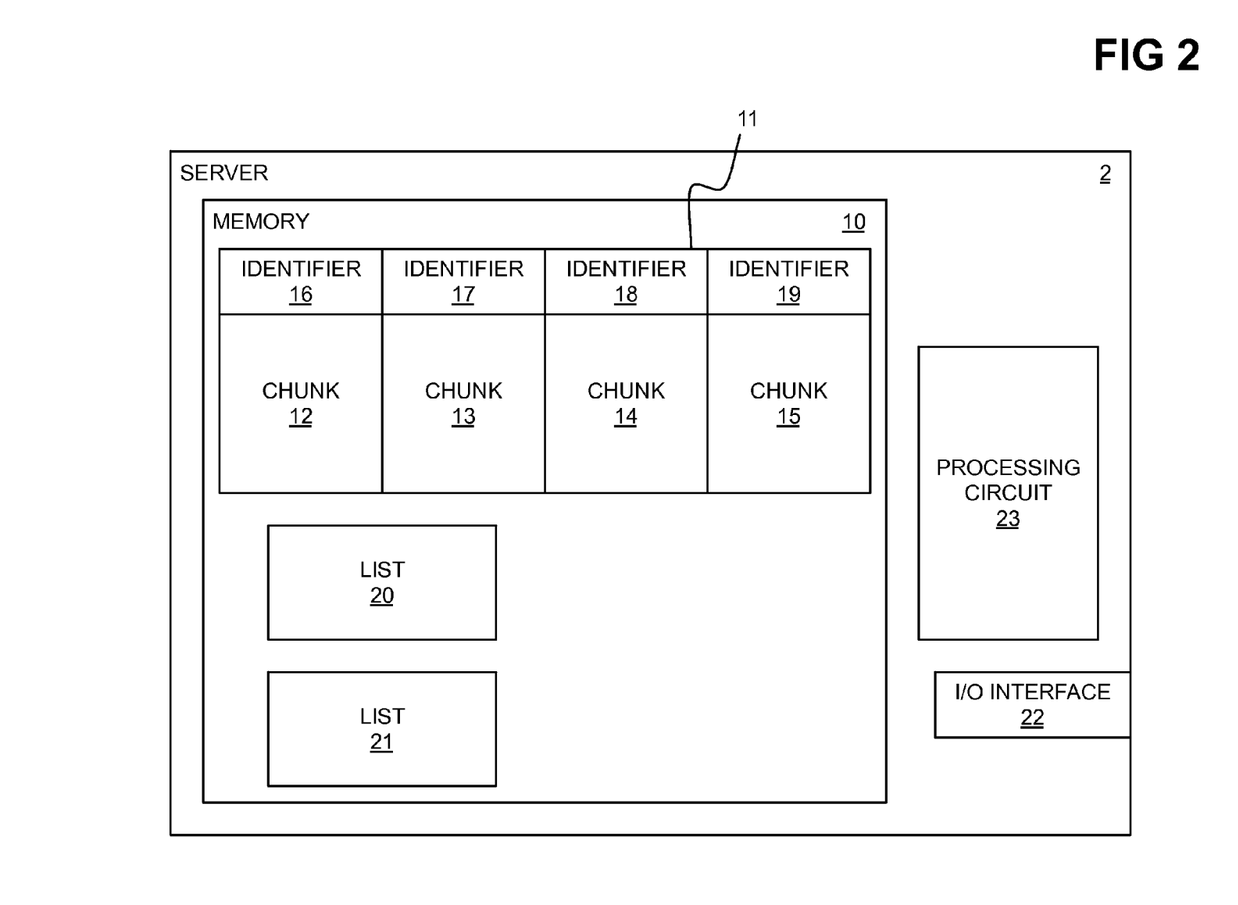
FIG. 2 is a diagram of a schematic hardware configuration of a server, according to an embodiment of the invention.

FIG. 2 illustrates a schematic structure of the server 2. The server 2 includes a memory 10. In the memory 10, at least one data file 11 is stored. The data file 11 can be divided in several chunks 12, 13, 14, 15. Furthermore, for each chunk 12, 13, 14, 15 an identifier 16, 17, 18, 19 is stored. The identifier 16, 17, 18, 19 identifies the corresponding chunk 12, 13, 14, 15. The identifier can be computed by the server 2.

Furthermore, the server 2 includes lists 20, 21 for the group of clients that should receive the data file 11. For each client, a specific list 20, 21 is stored. In the list of the client the information is stored which chunks the client has already received.

The server 2 includes an input/output (I/O) interface 22 and a processing circuit 23 for performing the function of the server 2. The I/O interface 22 is used for exchanging data and information with the network, i.e. the clients 3. The server comprises further hardware that is not depicted in detail.

Figure 3:
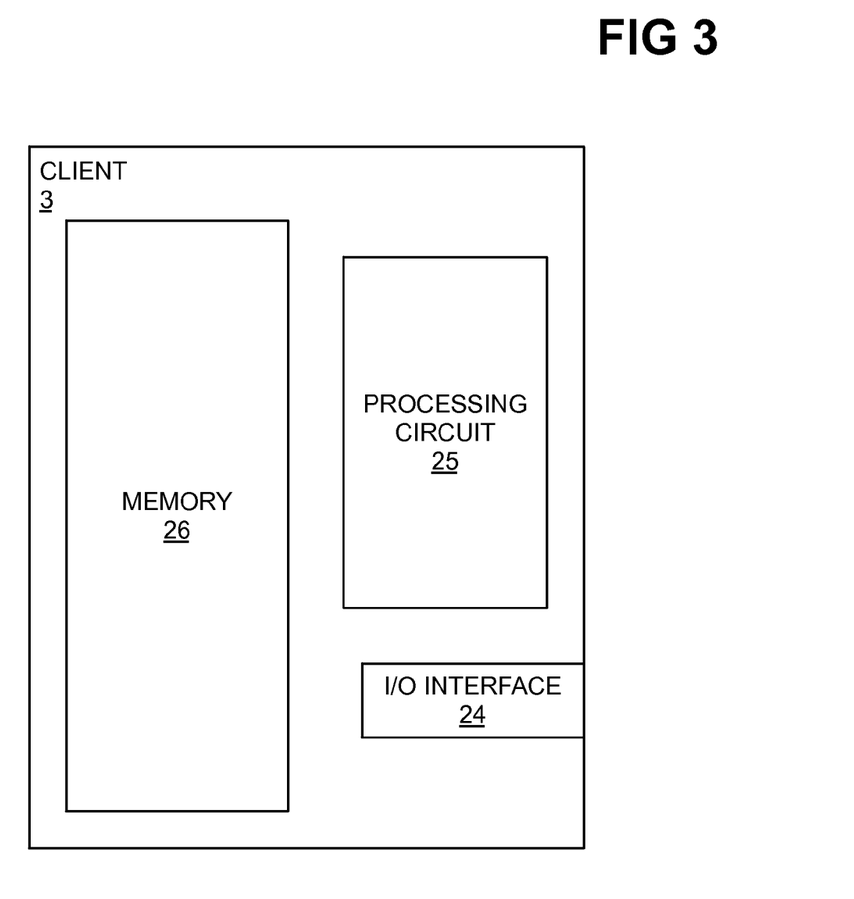
FIG. 3 is a diagram of a hardware configuration of a client, according to an embodiment of the invention.

FIG. 3 depicts a schematic structure of a client 3. The client 3 includes a second I/O interface 24 that is used for exchanging data and information with the server and other clients 3. Furthermore, the client 3 comprises a second processing circuit 25 that performs the function of the client 3. Additionally, the client 3 includes a second memory 26 that is used, for example, for storing chunks of a data file and identifiers of the chunks.

A basic scenario in which a data file is distributed is now described. A data file 11 with an amount F of data is stored on the server 3 and is to be delivered to all the clients 3 shown in FIG. 1. The server 2 may have a bandwidth B for sending data via the I/O interface 22 (B data per second). Then the entire file can be served to one client in the time F/B and to the number N of clients 3 in the time (N×F)/B using sequential distribution of the data. For fast distribution of the data file, it is beneficial that the clients 3 themselves can distribute chunks (parts) of the file after they received the chunks as this allows a given client to get different chunks of the file in parallel from multiple different sources—i.e., from different clients and/or the server.

To parallelize such a system, the file is broken into the number C of contiguous chunks each of the size F/C. It is assumed that C is much larger than N, i.e. that there are many more chunks than clients. A first chunk $F_1$ is distributed by the server 2 to the number of N/2 of the client 3, a second chunk F/2 is distributed to a predetermined number N/4 clients and so on such that the last chunk Fc is received by $N/(2 \times C)$ clients. At the end of this initial distribution all clients have one chunk.

Subsequently, clients with the first chunk $F_1$ exchange this chunk with clients that do not have the first chunk. The result of the first round is that all clients have the first chunk $F_1$. In addition, half of the clients now have the second chunk $F_2$ as the quarter who had it originally have exchanged the second chunk $F_2$ with those who had the first chunk, doubling their number. This process is repeated for the second, third and further chunks until the last chunk $F_2$ until all clients have all chunks. Assuming that the clients have a bandwidth for sending data of the number B per second, then the time to distribute the file to all clients is: $((N \times F)/(B \times C))+((C-1 \times F)/(C \times B))$.

The first part of the above expression is the time the server takes to deliver a single chunk to each client and the second part is the time during which clients exchange chunks. While in the simple sequential model the time increases linearly with a number N of clients, and the parallel model the cost of the number N of clients is only felt in handing out the single chunk and play no role during the exchange, moreover by making the number C of chunks arbitrary large, the initial part of the expression can be made arbitrarily small. For example, suppose a unit bandwidth and a unit file size. With the sequential system the time to deliver the file is proportional to the number N of clients while with the parallel system it is proportional to $N/C+(C-1)/C=N/C+1$.

Therefore, for a large enough number N of clients and number C of chunks, such that C is much larger than N, the increase in speed is proportional to N/C. Distributing a file to 10 clients is ten times faster using the parallel approach than the sequential 1 if the file can be broken into the number 100 of chunks.

The above model is a simplification of reality, however. For example, it assumes that clients have perfect knowledge of which clients they are to exchange chunks with, they all have equal capacities, there is no failure etc. However, this model shows the enormous gain that comes from using parallel techniques for disseminating large files. The distribution of large files can, for example, be used within a peer-to-peer file distribution system. Within an enterprise there is often the need to disseminate large files to multiple end points. For example, the presentation of a confidential new product must be sent to all members of the sales force, information about all sales achieved this day are sent to multiple applications and so on. This must be done in a timely fashion, however, but in an enterprise context there are additional constraints on file dissemination.

In particular, it is often the case that a strict audit trial must be left such that it can be proved who received the file and when. Such auditable processes are set to be compliant. Compliance is not simply a question of good practice, but is often a legal requirement. The need for auditability and compliance within the dissemination of files has led to the introduction of new products that allow the necessary information to be extracted by a monitoring process and thereby may offer advantages for the use of simple file transfer protocols such as FTP. According to embodiments of the invention, parallel techniques can be used while allowing an audit trial to be maintained.

Parallel techniques further allow the receiver of a part of a file (a chunk) to distribute it to other clients. The clients are active entities in the distribution of files, allowing the resources to be used to reduce the time it takes to send a file to all clients. Unlike in the sequential model in which each client is in constant and direct interaction with a central server, it is difficult to know what parts of the file the clients have received, as clients can receive chunks from each other without the server being aware. Using the parallel model, eventually all clients will get the complete file, but the server does not know when this occurs and cannot approve that the clients actually got the file. This is particularly problematic when clients can become disconnected during the file transfer and reconnect later.

Figure 4:
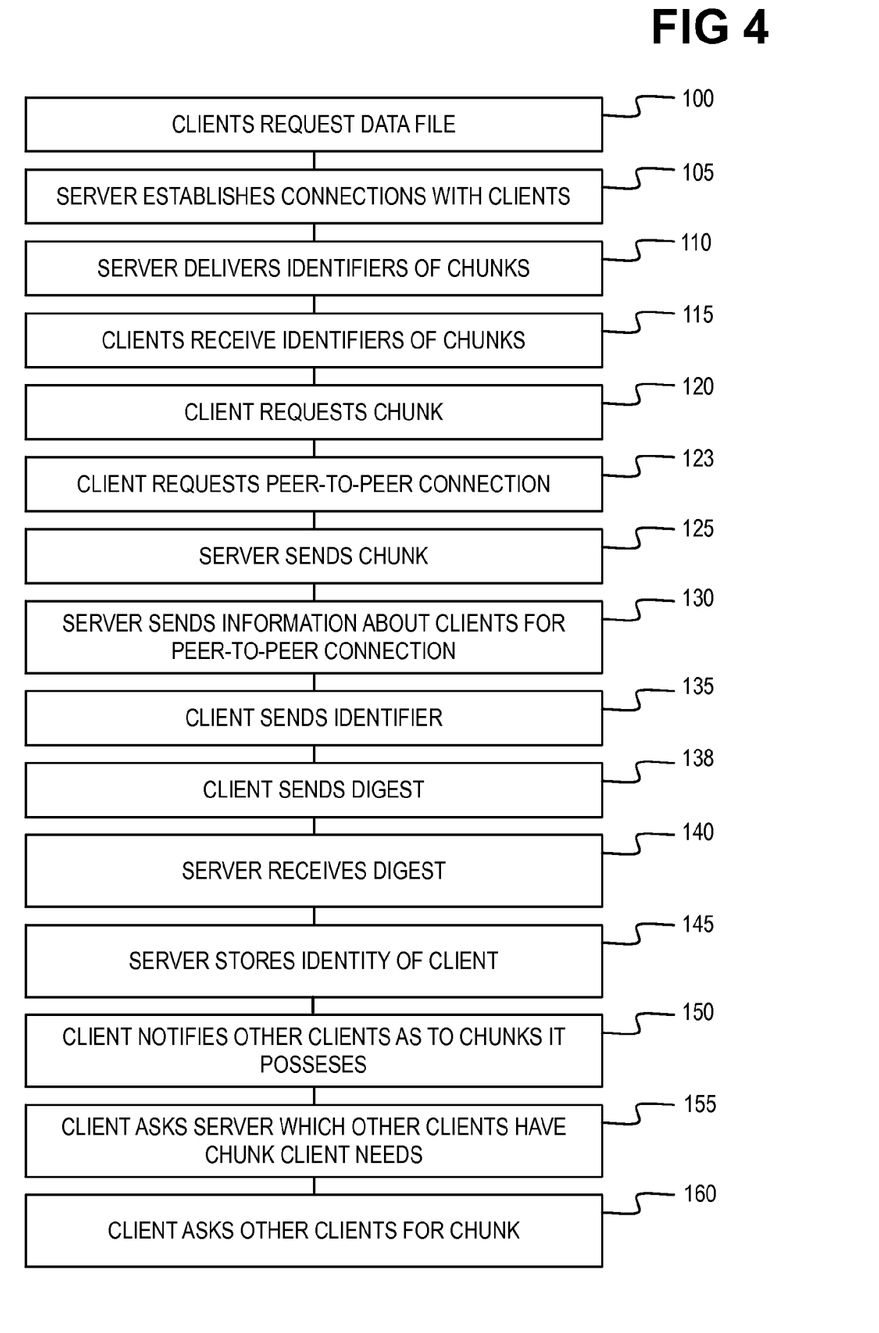
FIG. 4 is a flowchart of a method for distributing a data file in an auditable manner, according to an embodiment of the invention.

Embodiments of the invention may thus combine the advantages of the parallel model with auditability. FIG. 4 illustrates a flow chart of the used method in one embodiment. It is assumed that at a step 100 there is the number N of clients 3 all requiring a data file of a data size F. The file is already divided or will be divided by the server 2 into a number C of chunks of the file. The server 2 may now have the task to distribute the file to the number N of clients such that at any moment it can be proved which client has which chunks. The server may generate an identifier for each chunk. For example the server may generate an identifier by computing a cryptographic sum of data of the chunk such as a cryptographic hash sum. Depending on the used embodiment, the identifiers may yet exist.

In step 105, the server 2 notifies the number N of clients and establishes connections between the clients and the server 2. Then, in step 110, the server 2 delivers via a control path the identifiers 16, 17, 18, 19 of the chunks 12, 13, 14, 15 of the file 11 to the clients. The clients receive the identifiers of the chunks of the file and store the identifiers in step 115.

In step 120, the clients that received an identifier request the server 2 to transfer for example a randomly selected chunk of the file from the server to the client. By using a random choice, a good distribution of chunks becomes available to the clients. In addition, the clients may request in step 123 a subset of other clients with whom they are to establish a direct peer relationship. This means that each client may have an allowed group of clients with whom it is allowed to exchange chunks of the file.

At step 125, the server 2 sends a randomly selected chunk of the file to the clients that requested the transfer of the chunk. At step 130, the server 2 sends to the requesting clients the information about a subset of clients to which they are to establish a peer relationship. At step 135, each client 3 which received a chunk sends back an identifier of the chunk as information to the server 2.

The movement of chunks between computers can be performed via a data path and can be achieved using file transfer protocols, such as FTP, SCP, HTTP. When a client 3 has successfully obtained a chunk, it informs the server 2 sending a message via a control path. In the control path, the client must prove that it has the chunk in question. This proof may be performed by sending a digest to the server. After obtaining a chunk, the client produces a digest from at least a part of the content of the chunk concatenated with some data unique to the client and known to the server, such as the MAC address of the client.

Depending on the used embodiment, the client may encrypt the digest by means of the use of a cryptographic private key. According to an embodiment of the invention, such a digest can be produced by applying a mathematical function to a block of data of the chunk, in particular by applying a cryptographic hash function. Examples of functions that produce a cryptographic digest include SHA-1 or MD5. According to another embodiment, the digest may include information of the chunk and of the client that allow an identification from which client using which chunk the digest is generated.

In step 138, the client returns the digest to the server as a proof that it has received a determined chunk of the file. In step 140, the server receives the encrypted digest and decrypts the digest using the client's cryptographic key. The server knows the data of the chunks, the data of the clients that were used for generating the digest, and the technique by which the digest was generated. As such, the server can determine from which client the digest has originated and which chunk was received by the client.

In step 145, the server 2 stores the information which client received which chunk in the respective list 20, 21 of the client. If the digest sent by the client for a chunk does not correspond to the data of the clients or the chunks, then this event is noted by the server and the client is deemed not to possess the determined chunk. In step 150, a client informs the clients of its subgroup or all other clients which chunks it possesses. The client may transfer to the clients of the subset the identifiers of the chunks. In a further embodiment, a client can ask the server at step 155 which of the other clients actually possesses the chunks that the client still needs. In step 160, the client asks the respective clients to deliver a predetermined chunk, such as by sending the identifier of the chunk to the clients.

In a further embodiment, a client is not permitted to obtain a chunk from another client unless the other client can prove that it rightly received the chunk from the client. The client may verify via the server whether a determined client rightly possesses a chunk. To achieve this, the client asks the server 2 whether the determined client possesses a determined chunk or a chunk at all. After receiving the request, the server 2 checks the list of the determined client, which shows whether the determined client possesses chunks. The list of the client contains the information about the possession of a chunk only if the client sent a correct digest to the server as explained above. The server informs the requesting client whether the determined client rightly possesses a chunk.

Consequently, in this case, only a client that reports to the server 2 the receipt of a chunk can directly exchange chunks with other clients. This means that only a client that reports to the server that it has received a chunk can gather other chunks of the file from the other clients. A client that cannot receive a chunk it needs from another client may request the chunk from the server. In this case, the server knows whether the client has rightly received a chunk by checking the list of the client and the client is therefore allowed to receive further chunks. For example, a client may check the received identifiers and the identifiers of the received chunks and determine that all except one chunk were received and no other client possesses the last chunk. The client will thus ask the server to deliver the last chunk.

The server 2 may use this approach to determine exactly when a client has obtained the entire file or at least all chunks of the file except for a single last chunk that is held back by the server and that was never handed out to the clients, until a client specifically asks for it. The asking for the specific chunk demonstrates that the client in question already has received all other chunks of the file. It may be forbidden for the clients to deliver the last chunk to other clients. The last chunk may only be delivered by the server itself in one embodiment. In step 160 the server 2 transfers the single last chunk to the requesting client. The last chunk may be constructed in such a way that the client can only complete the file with the last chunk.

Embodiments of the invention may prevent a single client from ever being able to obtain a file without reporting it or claiming that it has the file when this is not the case. If there are multiple colluding misbehaving clients they still cannot claim to have the file when they do not. However, a client that legitimately obtains the last chunk and hands it out to other clients without reporting this fact, may make it possible for other clients to obtain the file without the server knowing. This will be true of any file distribution mechanism because once a misbehaving client possesses the file, it can hand the file out to other clients. However, even in this situation an audit trial is created that can be analyzed to identify which of the clients obtained the file and impermissibly delivered the file out to other clients.

Embodiments of the invention may be used in an enterprise service bus (ESB) to transfer within a network of an enterprise in a standard way information, such that services can be combined and aggregated. As such, different applications may be used, such as data power appliance, MQ messaging protocol, web sphere application server, and so on. Furthermore, the application managed file transfer (MFT) that is based on the MQ messaging protocol may be used. Embodiments of the invention may thus permit highly efficient file transfer without sacrificing compliance.

Embodiments of the invention can permit the parallel distribution of a file to a group of clients such that a client that received a chunk of a file may later transfer it to other clients and the location of the chunks of the file is reported to the server. Furthermore, information about the dissemination of the chunks of the file may be used to ensure the compliance of the process. The embodied system can be restarted in a well-defined state after failure of the entire or part of the system because the location of the received chunks of the file is known by the server.

In some embodiments of the invention, a division of the file transfer protocol into two paths is used: a data path and a control path. As such, the actual file is transferred using the data path, whereas the control path is used to transfer information about the location of the file chunks. In one embodiment, the client informs via the control path a trusted entity, such as the server, every time the client obtains a chunk. A client may advertise to its peers—i.e., other clients of the subset of clients to which the client in question belongs—which chunks it possesses. A client may not provide another client a chunk unless the latter client is able to provide a different chunk in return.

The control path may be implemented using a publish/subscribe protocol such as an MQ message broker. In one embodiment, proof of the reception of a chunk received by a client is achieved by the client creating a digest created from the contents of the chunk combined with some client-specific information. The digest may be encrypted using a private key of the client that generated the digest. The server may use the digest as a proof that the client received the chunk in question, to update the information about the location of the chunks that the server maintains.

A client may also check via the server that another client possesses the chunks that it claims to have. As noted above, a single last chunk may be handed out by the server to a client only if the client can prove that it possesses all other chunks. A client may also modify the chunk prior to disseminating the chunk.

Figure 5:
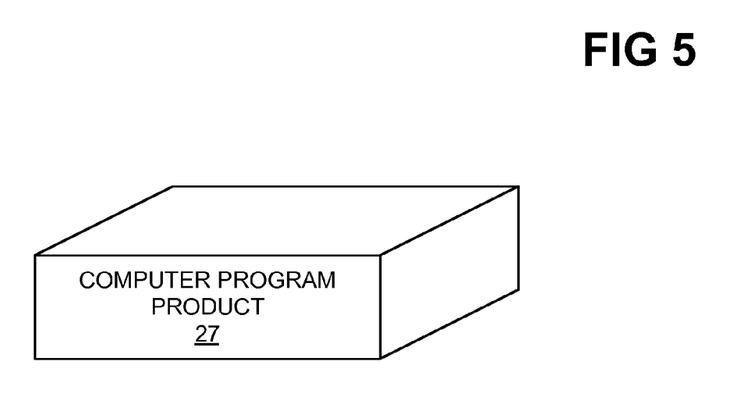
FIG. 5 is a diagram of a computer program product, according to an embodiment of the invention.

FIG. 5 shows a computer program product 27, which may be embodied as a memory circuit, a DVD, or another type of computer-readable medium, to distribute a data file from a server to several clients. The computer program in question delivers chunks of the file and identifiers of the chunks to clients, and receives a digest from a client. The program compares the digest with the sent chunks and known data of the clients to determine which client received which chunk of the file. The program also stores information as to which client possesses which chunk. In this respect, the computer program product 28 can include at least partially the steps or all steps of the program flow of FIG. 4 that has been described.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wired, optical fiber cable, RF, and so on, or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

What is claimed is:

1. A method for auditable data distribution, comprising:
   delivering, by a server, a plurality of chunks of a data file and identifiers of the chunks to a plurality of clients;
   for each chunk of the data file received by the clients;
      generating a digest, by the client that received the chunk, using at least a part of the chunk and further data of the client that received the chunk, the further data known to the server;
      sending, by the client that received the chunk, the digest to the server;
      receiving, by the server, the digest;
      determining, by the server, an identity of the client that received the chunk, by comparing the digest to the chunks that the server has sent and to the further data known to the server;
      storing, by the server, the identity of the client that received the chunk,
   wherein generating the digest by the client that received each chunk, sending the digest from the client to the server, determining the identity of the client that received the chunk by the server, and storing the identity of the client that received the chunk by the server provide for auditable data distribution of the data file among the clients from the server;
   requesting, by a first client of the plurality of clients, to receive a given chunk of the data file from a second client of the plurality of clients;
   determining, by the second client, that the first client already possesses a different chunk of the data file by at least the second client communicating with the server as to whether the first client possesses the different chunk;
   determining, by the second client, whether the given chunk of the data file is a last chunk of the data file;
   sending, by the second client, the given chunk of the data file to the first client only where the first client already possesses the different chunk of the data file and only where the given chunk of the data file is not the last chunk of the data file, and otherwise not sending the given chunk of the data file to the first client,
   wherein the clients are forbidden from sending the last chunk of the data file to any client, such that just the server is permitted to send the last chunk of the data file to any client.

2. The method of claim 1, wherein the data file is auditably distributed because the server knows the identity of the client that has received each chunk of the data file.

3. The method of claim 1, further comprising:
   encrypting, by the client that received the chunk, the digest before sending the digest to the server; and,
   decrypting, by the server, the digest before determining the identity of the client that received the chunk.

4. The method of claim 1, further comprising:
   receiving, by the first client, the given chunk of the data file from the second client;
   generating a digest, by the second client, using the given chunk of the data file and further data of the second client; and,
   sending, by the second client, the digest to the server.

5. The method of claim 1, wherein delivering the chunks of the data file and the identifiers of the chunks to the clients, by the server, comprises:
   distributing in parallel different chunks of the data file and the identifiers of the different chunks to different groups of the clients,
   and wherein the method further comprises exchanging, by the different groups of the clients, the different chunks and the identifiers of the different chunks among one another.

6. The method of claim 1, further comprising:
   informing, by a given client of the plurality of clients, other clients of the plurality of clients the chunks of the data file that the given client possesses; and,
   requesting, by one of the other clients, that the given client deliver thereto a specific chunk of the chunks of the data file that the given client possesses.

7. The method of claim 1, further comprising:
   holding back, by the server, a particular chunk of the data file such that the particular chunk is not initially delivered to the clients; and,
   requesting, by a given client of the plurality of clients, that the server send the particular chunk.

8. The method of claim 1, further comprising:
   checking with the server, by a given client of the plurality of clients, whether any other client possesses a specific chunk of the data file; and,
   in response to the server determining that a particular client possesses the specific chunk of the data file,
      requesting, by the given client, that the particular client send to the given client the specific chunk of the data file.

9. The method of claim 1, further comprising:
   holding back, by the server, a particular chunk of the data file such that the particular chunk is not initially delivered to the clients;
   proving to the server, by a given client, that the given client has all the chunks of the data file except for the particular chunk; and,
   in response to the given client proving to the server that the given client has all the chunks of the data file except for the particular chunk,
      sending to the given client, by the server, the particular chunk.

10. A server connectable to a plurality of clients, comprising:
   a processor; and,
   a computer-readable data storage medium to store a data file having a plurality of chunks and to store a computer program executable by the processor,
   wherein the computer program comprises:
      a first computer program part to deliver the chunks of the data file and identifiers of the chunks to the clients along a data path;
      a second computer program part to receive a digest for each chunk received by each client along a control path different from the data path, the chunk generated by the client that received the chunk using at least a part of the chunk and further data of the client, the further data known to the server;
      a third computer program part to determine for each chunk an identity of the client that received the chunk by comparing each digest received to the chunks of the data file and to the further data of each client;

a fourth computer program part to store the identity of the client that possesses each chunk; and a fifth computer program part to, responsive to receiving a request from a first client of the plurality of clients along the control path to determine whether a second client of the plurality of clients possesses a given chunk:

determine whether the second client possesses the given chunk; and notify the first client along the control path whether the second client possesses the given chunk to provide authorization or not as to whether the first client is permitted to transmit a different chunk to the second client that the second client requested from the first client, wherein receiving the digest for each chunk, determining the identity of the client that received the chunk, and storing the identity of the client that received the chunk provide for auditable data distribution of the data file among the clients from the server, wherein the clients are forbidden from sending a last chunk of the data file to any client, such that just the server is permitted to send the last chunk of the data file to any client.

11. The server of claim 10, wherein the data file is auditably distributed because the server knows the identity of the client that has received each chunk of the data file.

12. The server of claim 10, wherein the computer program further comprises:

a sixth computer program part to hold back a specific chunk of the file until a given client of the plurality of clients requests that the server deliver the specific chunk to the given client.

13. A client connectable to a server and to an additional client, comprising:

a processor; and, a computer-readable data storage medium to store at least a computer program executable by the processor, wherein the computer program comprises:

a first computer program part to receive a chunk of a data file from the server along a data path;

a second computer program part to generate a digest using at least a part of the chunk and further data of the client, the further data known to the server; and a third computer program part to send the digest to the server along a control path different from the data path, wherein generating the digest by the client, and sending the digest from the client to the server provide for auditable data distribution of the data file, and wherein the chunk is a first chunk of the data file, and the computer program further comprises:

a fourth computer program part to, responsive to receiving a request from the additional client along the control path for the client to send to the additional client the first chunk:

verify with the server that the additional client already possesses a second chunk of the data file; and send the first chunk along the data path to the additional client only where the additional client already possesses the additional chunk of the data file, as verified with the server, wherein the client is forbidden from sending a last chunk of the data file to any client, such that just the server is permitted to send the last chunk of the data file to any client.

14. The client of claim 13, wherein the data file is auditably distributed because the server knows the identity of the client that received each chunk of a plurality of chunks the data file.

* * * * *